(12) United States Patent
Grant et al.

(10) Patent No.: US 10,583,999 B2
(45) Date of Patent: Mar. 10, 2020

(54) SINGULATOR CONVEYOR ASSEMBLY FOR SEPARATING PARCELS

(71) Applicant: FIVES INTRALOGISTICS CORP., Louisville, KY (US)

(72) Inventors: Patrick H. Grant, Pewee Valley, KY (US); Steven Vann Schroader, Louisville, KY (US)

(73) Assignee: Fives Intralogistics Corp., Louisville, KY (US)

( * ) Notice: Subject to any disclaimer, the term of this patent is extended or adjusted under 35 U.S.C. 154(b) by 0 days.

(21) Appl. No.: 16/216,808

(22) Filed: Dec. 11, 2018

(65) Prior Publication Data

US 2019/0225432 A1    Jul. 25, 2019

Related U.S. Application Data

(63) Continuation-in-part of application No. 14/392,374, filed on Feb. 24, 2016, now Pat. No. 10,150,625.

(51) Int. Cl.
| | |
|---|---|
| B65G 47/22 | (2006.01) |
| B65G 13/00 | (2006.01) |
| B65G 47/32 | (2006.01) |
| B65G 47/26 | (2006.01) |
| B65G 47/256 | (2006.01) |

(52) U.S. Cl.
CPC .......... *B65G 47/32* (2013.01); *B65G 47/256* (2013.01)

(58) Field of Classification Search
None
See application file for complete search history.

(56) References Cited

U.S. PATENT DOCUMENTS

| | | | |
|---|---|---|---|
| 4,256,216 A | 3/1981 | Winters | |
| 4,643,291 A | 2/1987 | Counter | |
| 5,165,520 A | 11/1992 | Herve | |
| 5,551,551 A | 9/1996 | Crawford | |
| 5,701,989 A * | 12/1997 | Boone | B65G 47/682 198/443 |
| 5,794,790 A | 8/1998 | Bonnet | |
| 5,950,800 A * | 9/1999 | Terrell | B65G 47/1492 198/448 |

(Continued)

*Primary Examiner* — Kavel Singh
(74) *Attorney, Agent, or Firm* — Carrithers Law Office, PLLC

(57) ABSTRACT

A singulator conveyor system having conveying surfaces arranged in adjacent parallel configuration for separating and moving side by side packages. The singulator includes a first conveyor conveying lane having a high friction surface for conveying articles forward along a vertical side wall. A second conveyor conveying lane adjacent thereto has a lower friction surface including both forward and lateral conveying forces urging parcels forward and away from the first conveyor conveying lane and side wall. The lateral receiving edge of the second conveyor conveying lane is below the outer lateral edge of the first conveyor conveying lane and the conveying surface is transversely inclined and angled laterally upward having an elevated outer side edge even with or below the lateral receiving edge of an adjacent third conveyor conveying lane having a high friction conveying surface. The conveying surface of the second conveyor forms an inclined plane extending above an inner receiving side edge of the adjacent third conveyor conveying lane.

36 Claims, 10 Drawing Sheets

(56) References Cited

U.S. PATENT DOCUMENTS

| | | | |
|---|---|---|---|
| 6,076,683 | A | 6/2000 | Okada |
| 6,131,723 | A * | 10/2000 | Schroader ............ B65G 47/256 198/398 |
| 6,325,877 | B1 | 12/2001 | Murphy |
| 6,328,151 | B1 | 12/2001 | Spangenberg |
| 6,543,602 | B1 | 4/2003 | Bonnet |
| 6,609,607 | B2 | 8/2003 | Woltjer |
| 6,622,847 | B2 | 9/2003 | Schuitema |
| 6,910,568 | B1 | 6/2005 | Ydoate |
| 7,233,840 | B2 | 6/2007 | Schiesser |
| 7,497,316 | B2 | 3/2009 | Hysell |
| 7,703,596 | B1 | 4/2010 | Grollitsch |
| 7,726,461 | B2 | 6/2010 | Risley |
| 7,861,847 | B2 | 1/2011 | Fournel |
| 8,261,917 | B2 | 9/2012 | Enenkel |
| 9,452,449 | B2 * | 9/2016 | Schroader .............. B65G 13/00 |

* cited by examiner

SINGULATOR CONVEYOR ASSEMBLY FOR SEPARATING PARCELS

REFERENCES TO RELATED APPLICATIONS

This application claims priority from U.S. Pat. No. 10,150,625 issued on Dec. 11, 2018 from application Ser. No. 14/392,374 filed on Feb. 24, 2016 which is incorporated herein in its entirety.

TECHNICAL FIELD OF THE INVENTION

This invention relates generally to a singulator conveyor for sorting randomly arranged parcels and converting the random flow to a single file stream of items separating items which are not in the single file steam.

BACKGROUND OF THE INVENTION

The present invention relates to material handling and in particular to methods and apparatuses for conveying packages and a mechanism for controlling the location of packages on a conveyor.

Conventional conveyor systems convey large numbers of packages at high speed, especially in the parcel delivery industry wherein the packages are sorted according to the desired categories. The efficiency with which the packages are handled can be seriously diminished when a plurality of smaller packages, irregular sized or shaped items, or a mixture of large and small articles pass together on the conveyors as a single unit.

Problems occur with scanning and separating packages and parcels which travel through the conveying system as an aggregate unit rather than in a single file. Large packages hide small parcels and small side-by-side packages cause problems whenever they pass simultaneously through a bar code scanner causing confusion and sorting problems. Moreover, packages such as bags or other flexible containers having the weight distributed unevenly, or where the width and length of the container are extreme, or where the container is soft or only partially full such as a floppy partially filled bag of mail tend to present sorting problems in that they do not move in predictable lateral patterns.

The use of unscrambling conveyors sometimes referred to as singulators uses a plurality of driven rollers or belts whose axes extend obliquely relative to the direction of conveyance causing packages to be displaced laterally toward one side of the conveyor and become aligned behind one another.

Typical singulator conveyor systems for sorting parcels in typical applications comprise devices used that take randomly arranged items and convert the random flow to a single file stream of items. The items are conveyed forward with both forward and lateral forces and aligned along one side. A device can be placed after the aligned stream of items and items that did not make it all the way to the wall on the aligned side, are separated laterally away from the primary stream of parcels. Typical configurations direct the laterally removed items and recirculate them back to the skewed roller section for another pass and opportunity to be aligned against the wall, to be passed through with the primary line of flow. Items are conveyed forward with both forward and lateral forces and aligned along one side.

Present technology works well for rigid parcels, like a box, but items that do not behave as a rigid item like flexible parcels or large bags containing several small items are separated in accordance with their center of gravity and tend to be removed from the parallel stream even when the item is not abreast of another item.

Rearrangement of clusters of articles into a singulated single file is difficult to accomplish with packages having one dimension that is significantly greater than its other dimensions. If several packages having unequal loading, partially filled bags or boxes, or long and slender articles are conveyed side-by-side, conventional article singulation conveyors have difficulty separating side-by-side pairs into single file especially over a short distance and residence time. Packages having unequal weight, irregular dimensions, and off-set center of gravity can get repeatably shifted onto the output of the singulation conveyor. Occasionally instead of being positioned in single file, some of the packages may be conveyed abreast of one another, i.e., in side-by-side relationship traveling two abreast. The combined width of the two packages may present a problem at a downstream location in the conveyor system.

The need exists for a singulator conveying having separation capabilities effective in separating side-by-side articles including packages and parcels having unequal loading such as different sized packages (e.g., boxes, flats and softpacks), partially filled bags or boxes, or long and slender articles having an offset center of gravity into one or more rows of single file singulated articles over a short distance and residence time.

The present invention insures that two of more small items abreast of one another are separated while permitting large items to pass thorough the singulator even when the item is a large bag of small items.

Sorting parcels in typical applications devices take randomly arranged items and convert the random flow to a single file stream of items. Items are conveyed forward with both forward and lateral forces and aligned along one side. A device can be placed after the aligned stream of items and items that did not make it all the way to the wall on the aligned side, are separated laterally away from the primary stream of parcels. Typical configurations direct the laterally removed items and recirculate them back to the skewed roller section for another pass and opportunity to be aligned against the wall, to be passed through with the primary line of flow. Prior art conventional conveying systems work well for rigid parcels, like a box, but items that do not behave as a rigid item, like a large bag of small items tend to be removed from the parallel stream even when the item is not abreast of another item. The instant invention provides an apparatus and method capable of separating rigid parcels as well as large bags of small parcels.

SUMMARY OF THE INVENTION

The present invention relates to a conveying system for conveying, aligning, and organizing randomly supplied articles including side-by-side articles received from a feed conveyor into a single file relationship. The articles are conveyed onto a singulator device having separating capabilities which includes a multi-lane conveyor assembly following the feed conveyor. The singulator arranged in alignment with, downstream of the feed conveyor for receiving articles therefrom.

Articles received from a feed conveyor are conveyed through a conveyor assembly defining a singulator comprising three conveyors arranged in an adjacent parallel configuration having multiple conveyor lanes which tends to arrange the articles in a single file rows in a spaced apart relationship.

The singulator article removal conveyor includes first, second, and third conveying lanes disposed in parallel alongside one another and driven in a manner imparting mutually divergent conveying forces for separating and moving side by side parcels or articles. The first and third conveying lane has a conveying surface with a higher coefficient of friction than that of the second conveying lane so that any articles contacting the first conveying lane will be controlled by that lane. A second conveyor conveying lane adjacent thereto has a lower friction surface including both forward and lateral conveying forces urging parcels forward and away from the first conveyor conveying lane and side wall. The lateral receiving edge of the second conveyor conveying lane is below the outer lateral edge of the first conveyor conveying lane and the conveying surface is transversely inclined and angled laterally upward having an elevated outer side edge even with or below the lateral receiving edge of an adjacent third conveyor conveying lane having a high friction conveying surface. The conveying surface of the second conveyor forms an inclined plane extending above an inner receiving side edge of the adjacent third conveyor conveying lane.

The singulator conveyor system comprises a selected number of conveyors or conveyor conveying lanes arranged in an adjacent parallel configuration for separating side-by-side packages and parcels having unequal loading such as different sized packages (e.g., boxes, flats and softpacks), partially filled bags or boxes, or long and slender articles having an offset center of gravity into one or more rows of single file singulated articles over a short distance and residence time. The singulator conveying system insures that two or more small items abreast of one another are separated while permitting large items to pass thorough the singulator even when the item is a large bag of small items. A first conveyor conveying lane ("first conveying lane"), includes a high friction surface for conveying articles forward along a vertical side wall where incoming items are positioned there along. A second conveyor conveying lane, (second conveying lane"), adjacent thereto has a lower friction surface or lower friction conveying surface including both forward and lateral conveying forces urging parcels forward and away from the first conveying lane and side wall. The second conveyor conveying lane comprises a series of driven rollers whose rotary axes are skewed relative to a lateral direction of travel so that the packages are conveyed simultaneously forward and laterally outwardly away from the first conveyor conveying lane. The inner edge of the second conveyor conveying lane is positioned below the first conveyor conveying lane and is transversely inclined and angled upward to a position below or even with the outer receiving edge of a third conveyor conveying lane surface adjacent thereto. Packages resting on the first conveyor, or on the first conveyor and second conveyor are conveyed through the singulator. Packages which fall off of the first conveyor onto the second conveyor or which rest entirely on the second conveyer are moved forward and laterally toward the third conveyor conveying lane, (third conveying lane"), having a high friction conveying surface until the center of gravity of the packages extend past the lateral edge of the third conveying lane whereby the packages fall over due to momentum and control is transferred to the third conveying lane.

More specifically, the singulator comprises a first conveying lane, a second conveying lane, and a third conveying lane, each one driven and arranged in an adjacent parallel configuration. The first conveying lane has a high friction conveying surface for conveying articles forward along a vertical side wall for receiving articles from an upstream conveying lane. The first lane is sized to be no wider than the smallest item to be conveyed thereon. The second conveying lane has a lower friction conveying surface than the first conveying lane, and is disposed beside the first conveying lane. The second conveying lane and has an inner receiving edge disposed at a lower elevation than the outer edge of the first conveying lane. The second conveying lane comprises a series of driven rollers having rotary axes skewed relative to a forward direction of travel so that the articles are conveyed simultaneously forward and laterally outwardly away from the first conveying lane and the vertical side wall. The second conveying lane is transversely inclined and angled upward forming an elevated outer side edge. The second conveying lane has a conveying surface forming an inclined plane extending at an angle above an inner receiving side edge of the adjacent third conveying lane and spaced apart from the third conveying lane a selected distance conveying the articles from the second conveying surface up and over onto the third conveying lane. The third conveying lane has a higher friction conveying surface than the second conveying lane and the higher friction conveying surface of the third conveying lane has an inner receiving side edge at an elevation higher than the elevated outer side edge of the second conveying lane.

The speed of the first, second or third conveyors and/or conveying lanes can be adjusted with respect to one another to align articles thereon. Moreover, the speed of the conveying lanes could be adjusted relative to one another to enhance the separation capabilities of the singulator conveyor assembly.

The singulator conveyor system consists at least three parallel and laterally disposed conveyor surfaces at selected levels including a driven first conveyor having a first conveying lane including a high friction conveying surface for conveying articles along in a forward direction in a generally horizontal plane, a vertical side wall extending along an outer lateral edge of the first conveyor conveying lane. A driven second conveyor conveying lane is positioned adjacent to an outer lateral edge of the first conveying lane. The second conveying lane has a inner lateral receiving edge positioned below the outer lateral edge of the first conveying lane and extends upward laterally therefrom at a selected angle forming an inclined plane. The second conveying lane has a lower friction conveying surface formed by a series of driven rollers whose rotary axes are skewed relative to a lateral direction of travel for conveying packages simultaneously forward and laterally outwardly away from the first conveying lane. A driven third conveyor having a third conveying lane has a high friction conveying surface for conveying articles along in a forward direction in a generally horizontal plane disposed adjacent an outer lateral edge of the second conveying lane. The second conveying lane has an outer lateral edge extending upward toward an inner lateral receiving edge of the third convey conveying lane. The outer lateral edge of the second conveying lane is positioned below or even with the lateral inner receiving edge of the third conveying lane for conveying articles upward and over the inner lateral receiving edge of the third conveying lane where the lateral momentum of the article being transferred laterally will tend to position the center of gravity of the article so that the article falls under control of the third conveying lane.

It is an object of the present invention to provide a singulator comprising a multi-lane conveyor assembly having at least three driven conveying lanes arranged in parallel relationship adjacent one another. The conveying lanes lie in a horizontal plane along their lateral axis. A laterally positioned side wall extends along side a first conveying lane which tends to convey items forward and along the laterally positioned side wall.

It is an object of the present invention to provide a driven first conveying lane including a belt or rollers having a high friction surface for conveying articles along a vertical side wall where incoming items are positioned there along at a selected speed.

It is an object of the present invention to provide that packages resting on the first conveyor lane having a high friction surface and objects resting on both the first conveyor lane and the second conveyor lane having a lower friction surface move forward.

It is an object of the present invention to provide a second conveyor having a lower friction surface conveyor lane including both forward and lateral conveying forces. The edge of the second conveying lane adjacent the first conveying lane is disposed at a slightly lower elevation along the lateral axis of the first conveying lane providing a drop off. The lateral forces of the second conveying lane pull the articles positioned on the second conveying lane away from the first conveying lane and primary flow side wall to separate two small items that might enter abreast of one another.

It is an object of the present invention to provide for the lower friction conveying surface of a second conveying lane to be angled vertically at a selected angle from the first conveying lane providing an inclined plane extending upward from below the outer lateral edge of the first conveying lane upward toward the third conveying lane so that the inclined conveying plane of the second conveying lane extends above the inner lateral receiving edge of the adjacent third conveying lane.

It is an object of the present invention to provide a driven third conveying lane having a high friction surface which is laterally positioned alongside of the second conveying lane on the opposite side from the first conveying lane primary flow side. In one preferred embodiment, the third conveying lane is elevated at the same level as the first conveying lane. The conveying surface of the third conveying lane is above the elevation of a carrying surface of the second conveying lane where they mate along their lateral edge.

It is an object of the present invention to provide that the plane of the third conveying lane extends above the edge of the second conveying lane surface.

It is an object of the present invention to provide a means to separate packages traveling abreast of one another so that packages or articles that do not come in contact with the first conveying lane surface and rest on the second conveying lane surface are carried forward and laterally at an upward angle toward the outer edge of the second conveying lane forming a plane extending just above the receiving edge of the third high friction conveying lane. A portion of each article or package that extends above the third conveyor lane will move upward and over the third conveyor lane until the center of gravity extends past the inner lateral receiving edge of the third conveyor and the package drops onto the high friction surface of the third conveying lane. Thus, when two articles enter the singulator abreast of one another, the outwardly positioned article is transferred forward and laterally until the center of gravity passes beyond the lateral edge of the second conveying lane, at which time a definite transfer of control will occur as the item drops down and rests atop of the third conveying lane.

It is an object of the present invention to provide a singulator conveyor whereby the packages fall onto the third conveying lane when the center of gravity of the package extends over past the edge of the second conveying lane.

It is an object of the present invention to position the first conveying lane and the third conveying lane in parallel lateral alignment in a selected plane.

It is an object of the present invention to provide a singulator conveyor whereby the physical position of the outer edge of the second conveying lane can be positioned even with or below the inner receiving edge of the third conveying lane depending upon the space between the outer edge of the second conveying lane and the inner receiving edge of the third conveying lane.

It is an object of the present invention to provide a singulator conveyor whereby the second conveying surface is angled laterally at an angle creating an inclined plane extending along the surface of the second conveyor and above the third conveyor.

It is an object of the present invention for the speed of the first conveying lane, the second conveying lane, and the third conveying lane is adjustable relative to one another.

It is an object of the present invention that the first conveying lane and the third conveying lane travel at the same rate of speed in order for large parcels resting on the first conveying lane and the third conveying lane to be conveyed thorough the singulator conveyor apparatus.

It is an object of the present invention that the second conveying lane is inclined at an obtuse angle with respect to the longitudinal direction and the speed of the second conveying lane is set so that it has a forward longitudinal component equal to the forward speed of the first conveying lane so that a parcel resting on both of the first conveying lane and the second conveying lane will travel forwardly without being rotated.

Other objects, features, and advantages of the invention will be apparent with the following detailed description taken in conjunction with the accompanying drawings showing a preferred embodiment of the invention.

BRIEF DESCRIPTION OF THE DRAWINGS

A better understanding of the present invention will be had upon reference to the following description in conjunction with the accompanying drawings in which like numerals refer to like parts throughout the several views and wherein.

DETAILED DESCRIPTION OF THE PREFERRED EMBODIMENT

Figure 1:
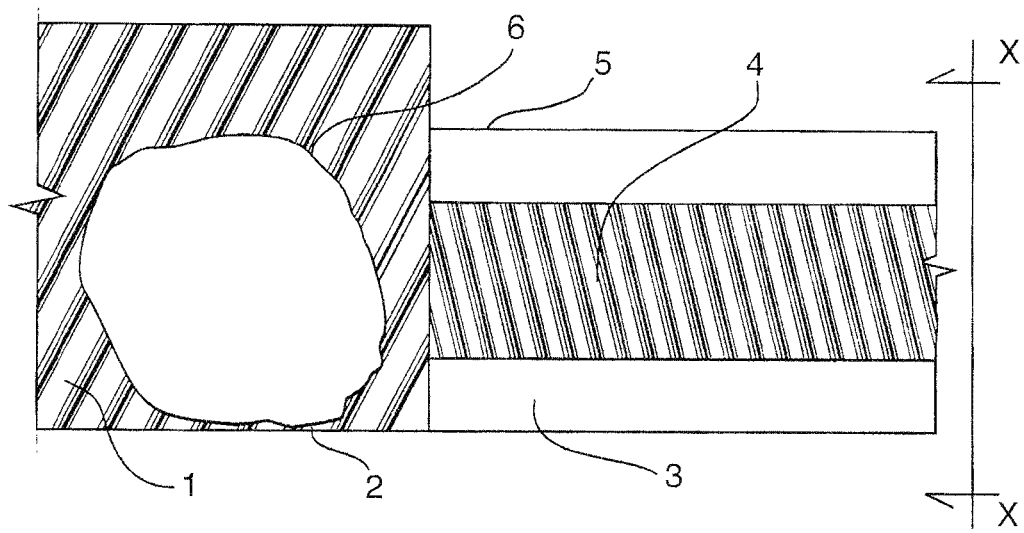
FIG. 1 is a top view showing a feed conveyor comprising a plurality of skewed rollers conveying articles along a laterally positioned side wall onto a singulator having a first conveying lane surface having a high friction surface adjacent and parallel to the side wall with a lane width equal to that of the smallest item, a second conveying lane surface having a lower friction surface comprising skewed rollers parallel to and adjacent the first conveying lane, and a third conveying lane surface having a high friction surface adjacent to and parallel with the second conveying lane wherein a bag or small parcels are disposed upon the feed conveyor.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. As used herein, the term "about" can be reasonably appreciated by a person skilled in the art to denote somewhat above or somewhat below the stated numerical value, to within a range of +10%.

The present invention now will be described more fully hereinafter with reference to the accompanying drawings, in which preferred embodiments of the invention are shown.

This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As shown in figures, the present invention relates to a conveying system for conveying and organizing articles in side-by-side relationship into randomly supplied articles.

As best illustrated in the figures, the articles such as a bag or small parcels or packages 6, 7, and 8, or large parcels 9 are conveyed from a feed conveyor 1 comprising a plurality of skewed rollers onto a multi-lane singulator conveyor assembly 11 having separating capabilities. The singulator 11 is arranged in alignment with, downstream of, and below the lower end of the feed conveyor 1 for receiving articles therefrom. The singulator includes a central conveying surface including a plurality of driven skewed rollers disposed between a pair of high friction surface belt conveying surfaces. A downstream conveyor receives articles from the singulator spaced apart and with single file along the wall.

In one preferred embodiment, the singulator assembly 11 includes first conveyor 3 defining a first conveying lane including rollers or preferably a belt having a high friction surface for conveying articles 6 along a vertical side wall 2 where incoming items are positioned there along. Packages resting against the vertical side-wall 2 and resting on the first conveyor 3 will proceed across the conveyor to the down stream conveyor 32. The first lane is sized to be no wider than the smallest item to be conveyed thereon.

A second conveyor defining a second conveying lane 4 having a lower friction surface shown comprising a plurality of rollers 34 has an inner edge 36 positioned below and adjacent to an outer lateral edge 38 of the first conveyor or first conveying lane 3 and is angled downwardly toward the first conveying lane. The second conveying lane 4 is typically at least as wide usually wider than the first conveying lane 3. The second conveying lane 4 typically comprises a series of driven rollers 34 whose rotary axes are skewed relative to a longitudinal direction of travel so that the packages are conveyed simultaneously laterally forward and laterally outwardly away from the first conveying lane. The inner lateral receiving edge 36 of the second conveying lane is positioned a selected distance below the outer lateral edge 38 of the first conveying lane 3 situated adjacent the lateral outer edge 38 of the first conveying lane having a high friction surface. The second conveying lane 4 has a lower friction surface for receiving packages which fall therefrom. The lateral forces of the second conveying lane pull items positioned on the second conveying lane away from the first conveying lane and primary flow side wall to separate two small items 7, 8 that might enter abreast of one another. Packages which rest side by side or abreast one another are separated so that the package on the first conveying lane moves forward and the adjacent package resting on the second conveying lane is pulled away from the first conveying lane. The second conveying lane has a lower lateral receiving edge positioned below the outer lateral edge of the first conveying lane and extends upward laterally therefrom at a selected angle forming an inclined plane extended above inner lateral receiving edge 40 and conveying surface of an adjacent third conveying lane defining a third conveying lane 5 having a high friction conveying surface. The outer lateral edge 42 of the second conveying lane is positioned even with or below the inner lateral receiving edge 40 of the third conveying lane.

Another feature of the present invention deals with a problem involving packages having a convexly curved bottom. It will be appreciated that such a curved bottom, even though it may overlap both the first and second conveying lanes might tend to contact only the second conveying lane and thus will be unnecessarily sent to the return conveyor. However, the curved bottom is likely to make at least line contact with the first conveying lane and the second conveying lane surface is situated slightly lower than the surface of the first conveying lane, and is inclined downwardly slightly toward the first lane at a selected angle of up to 30 degrees and preferably from 1 to 10 degrees. As a result, curved package bottoms will tend to become oriented such that at least contact is made with an edge of the high friction surface of the first conveying lane. Due to the high coefficient of friction of the conveying surface of the first conveying lane, the first conveying lane will control the direction of travel of the package.

The third conveying lane moves articles laterally forward with no lateral motion; however, it is contemplated that the speed of the first, second or third conveying lanes could be adjusted with respect to one another to align articles thereon.

In summary, the singulator conveyor system consists of and/or comprises a multi-conveyor singulator assembly comprising at least three parallel and laterally disposed conveyor surfaces at selected levels including a driven first conveyor having a high friction conveying surface for conveying articles along in a forward direction in a generally horizontal plane forming a first conveying lane, a vertical side wall extending along an outer lateral edge of the first conveyor. A driven second conveyor is positioned adjacent to an outer lateral edge of the first conveyor. The second conveyor has a lower lateral receiving edge positioned below the outer lateral edge of the first conveyor and extends upward laterally therefrom at a selected angle forming an inclined plane. The second conveyor has a lower friction conveying surface formed by a series of driven rollers whose rotary axes are skewed relative to a lateral direction of travel for conveying packages simultaneously forward and laterally outwardly away from the first conveyor. A driven conveying lane conveyor having a high friction conveying surface for conveying articles along in a forward direction in a generally horizontal plane forms a third conveying lane disposed adjacent an outer lateral edge of the second conveyor. The second conveyor has an outer lateral edge extending upward toward an inner lateral receiving edge of the conveying lane conveyor. The outer lateral edge of the second conveyor is positioned below or even with the lateral inner receiving edge of the conveying lane conveyor for conveying articles upward and over the inner lateral receiving edge of the conveying lane conveyor.

The inclined plane and angle of the rollers of the second conveying lane 4 guide and urge articles upwardly toward the third conveying lane where the lateral momentum of the article being transferred laterally will tend to position the center of gravity of the item, so that the article falls under control of the third conveying lane's forward conveying forces and is no longer influenced by the conveying forces of the second lane.

Figure 7:
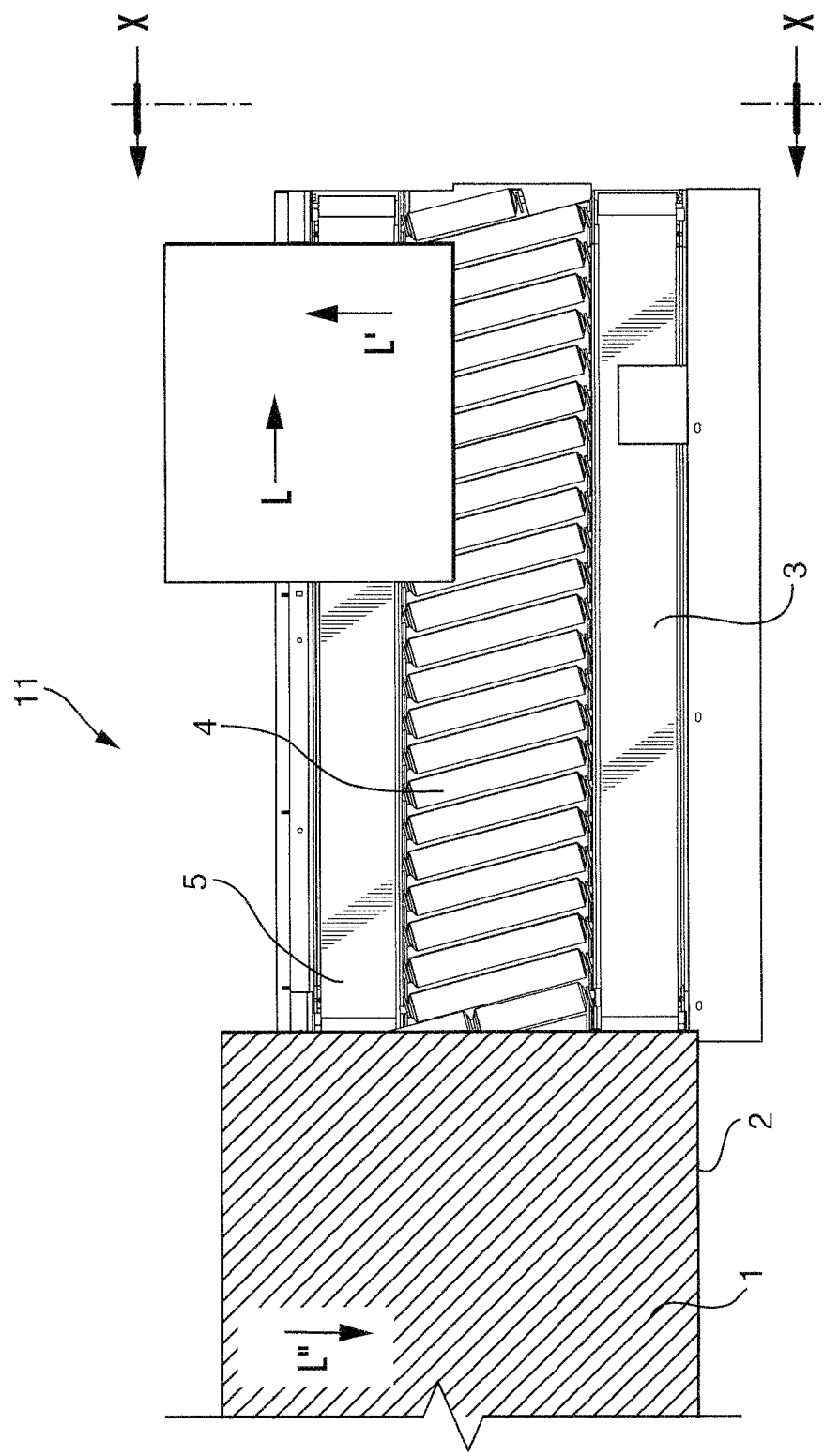
FIG. 7 shows the first, second, and third conveying lanes of FIG. 4, wherein the small package is aligned with and conveyed on the first conveying lane, and the second larger package is positioned so that it rests on the third conveying lane with the center of gravity beyond the edge of the third conveying lane conveying surface.
Figure 8:
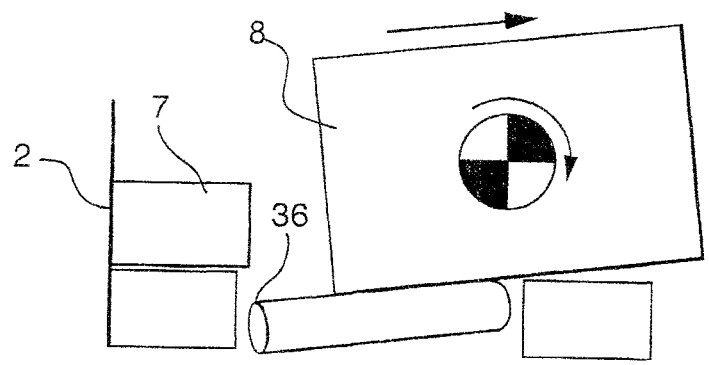
FIG. 8 is a sectional view of FIG. 7 showing the small package aligned with and conveyed on the first conveying lane and showing the second larger package positioned so that it rest on the second conveying lane but has just reached the point where it begins to rotate and transfer to control of the third conveying lane because the lower friction surface of the second conveying lane does not push the package.
Figure 9:
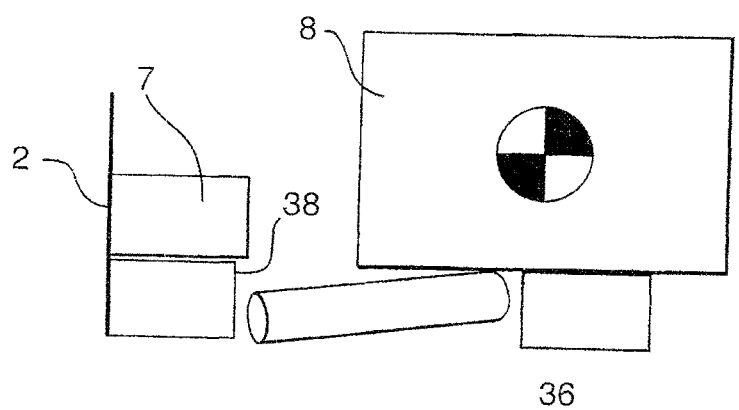
FIG. 9 is a sectional view of FIG. 7 showing the small package aligned with and conveyed on the first conveying lane adjacent the side wall, and showing the second package after transfer from the second conveying lane up onto the third high friction conveying lane having a portion extending over the outer edge thereof whereby the center of gravity is beyond the edge of the third conveying lane.

The feed conveyor 1 is typically as wide as if not wider than the singulator 11 as shown in FIG. 7 and may comprise a series of driven rollers whose rotary axes are skewed relative to a lateral direction of travel so that the packages are conveyed simultaneously laterally forward L and laterally inwardly L" toward the first conveying lane 3 and side wall 2. The feed conveyor may also end in a staggered formation where the proximate portion 46 adjacent the side wall 2 feeds the inner high friction conveyor of the singulator, a second distal portion 48 feeds the second conveying lane, a conveyor portion 50 feeds the third conveying lane and an optional fourth portion 50 extends outwardly toward an adjacent conveying surface comprising a transverse plane forming a discharge chute 30. Additional distal end portions could feed other conveyors and/or discharge or directional chutes.

Figure 10:
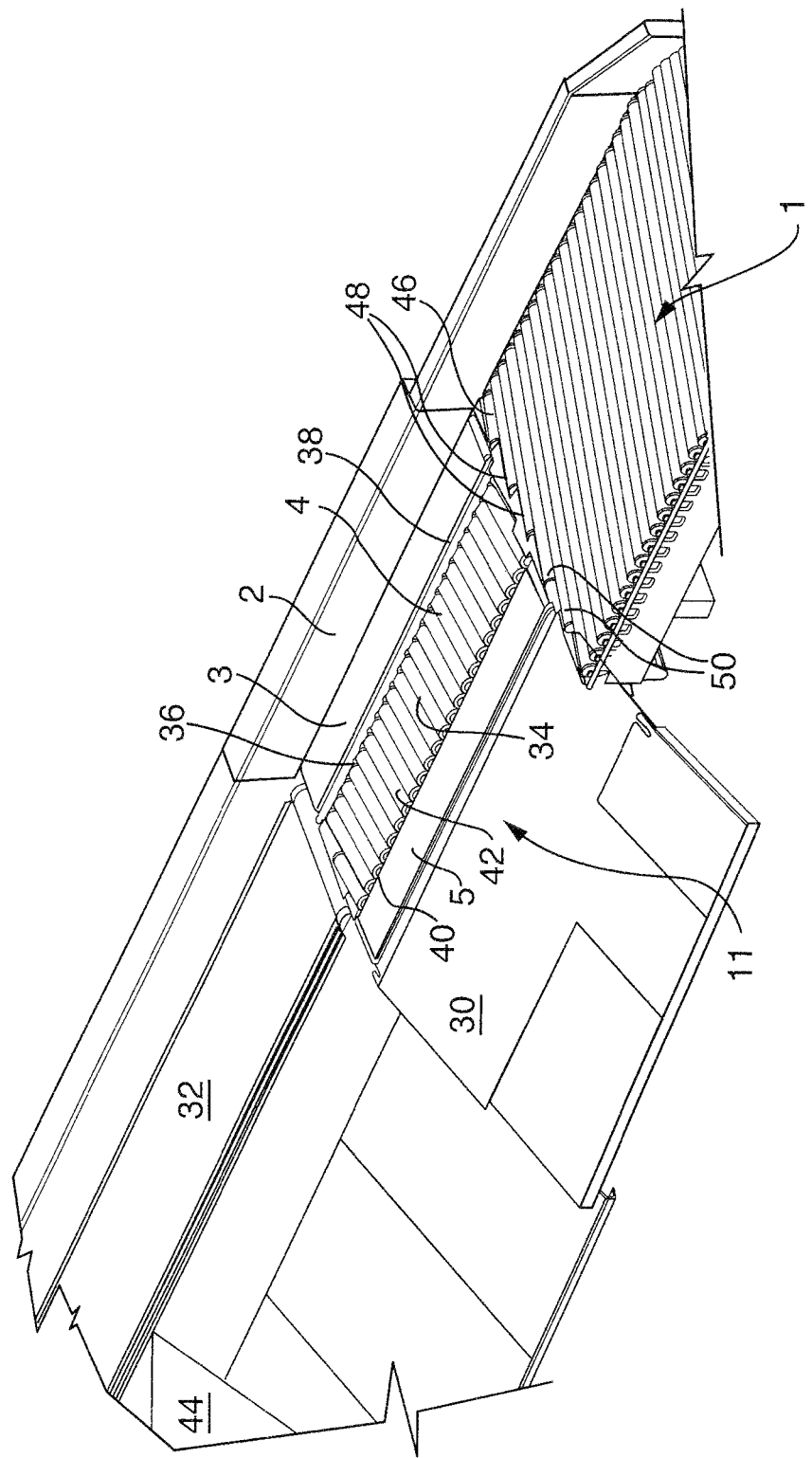
FIG. 10 is a perspective view of the singulator assembly of the present invention showing the feed conveyor, first conveying lane having a high friction belt, second conveying lane having low friction rollers, and third conveying lane having a high friction belt, a down stream conveyor and fourth conveying means comprising an inclined transverse plane extending along the lateral edge of the third conveying lane and downstream conveyor.
Figure 11:
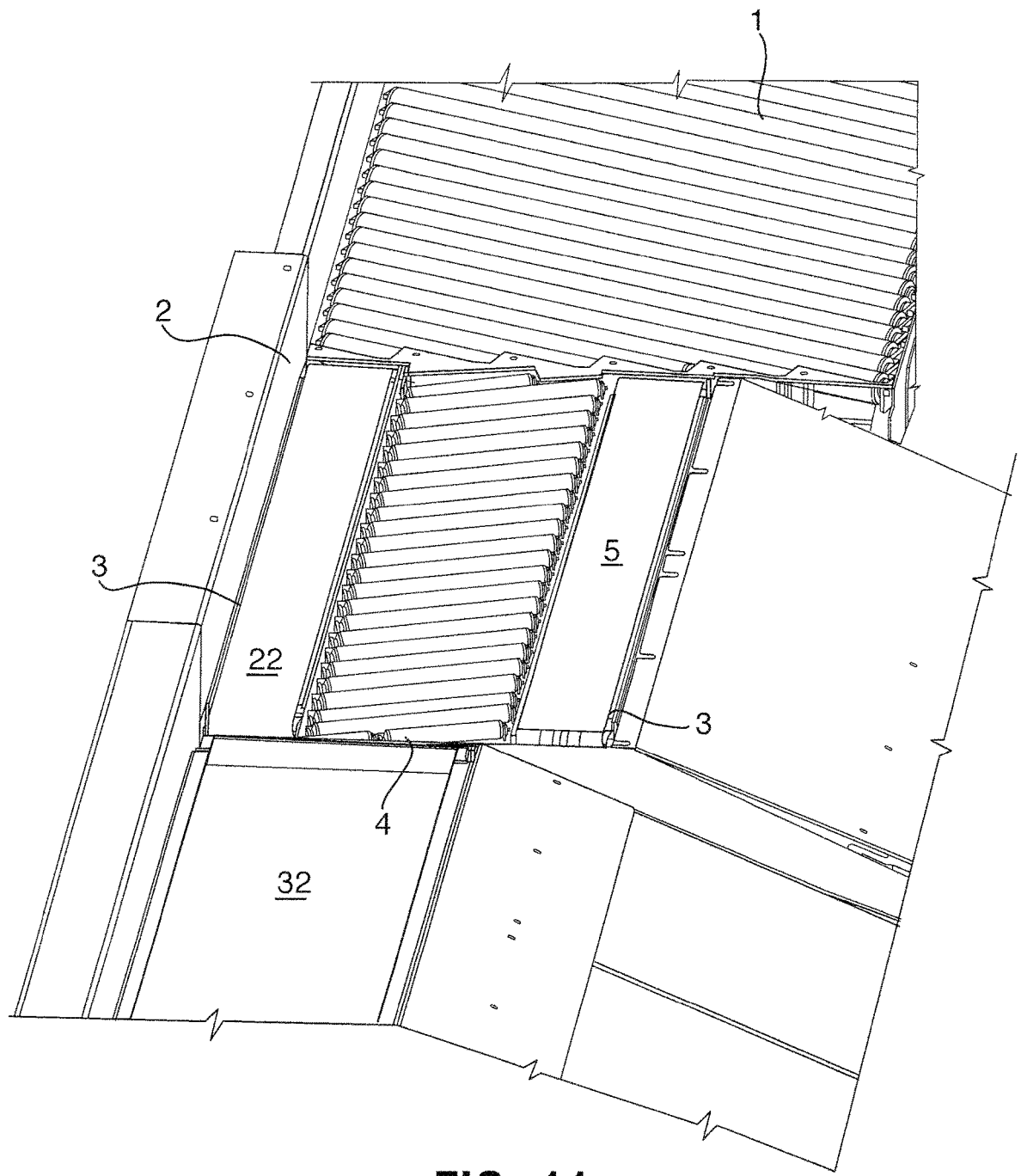
FIG. 11 is a perspective up stream end view of the singulator assembly shown in FIG. 10 showing the inner lateral edge of the second conveying lane positioned below the lateral outer edge of the first conveying lane and outer lateral edge positioned below the inner receiving edge of the third conveying lane and showing the incline plane of the second conveying lane angled upward toward the third conveying lane wherein the carrying plane of the second conveying lane rollers extends above the inner lateral receiving edge of the third conveying lane.
Figure 12:
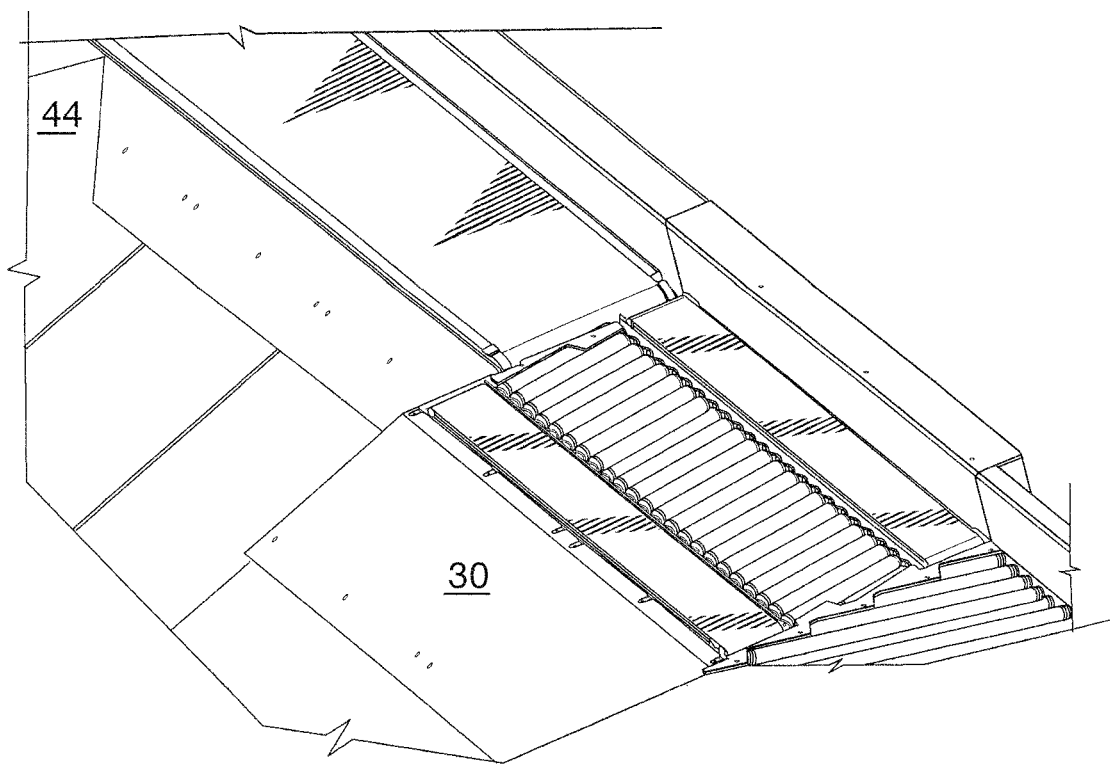
FIG. 12 is a perspective down stream end view of the conveyor system shown in FIGS. 10 and 11.
Figure 13:
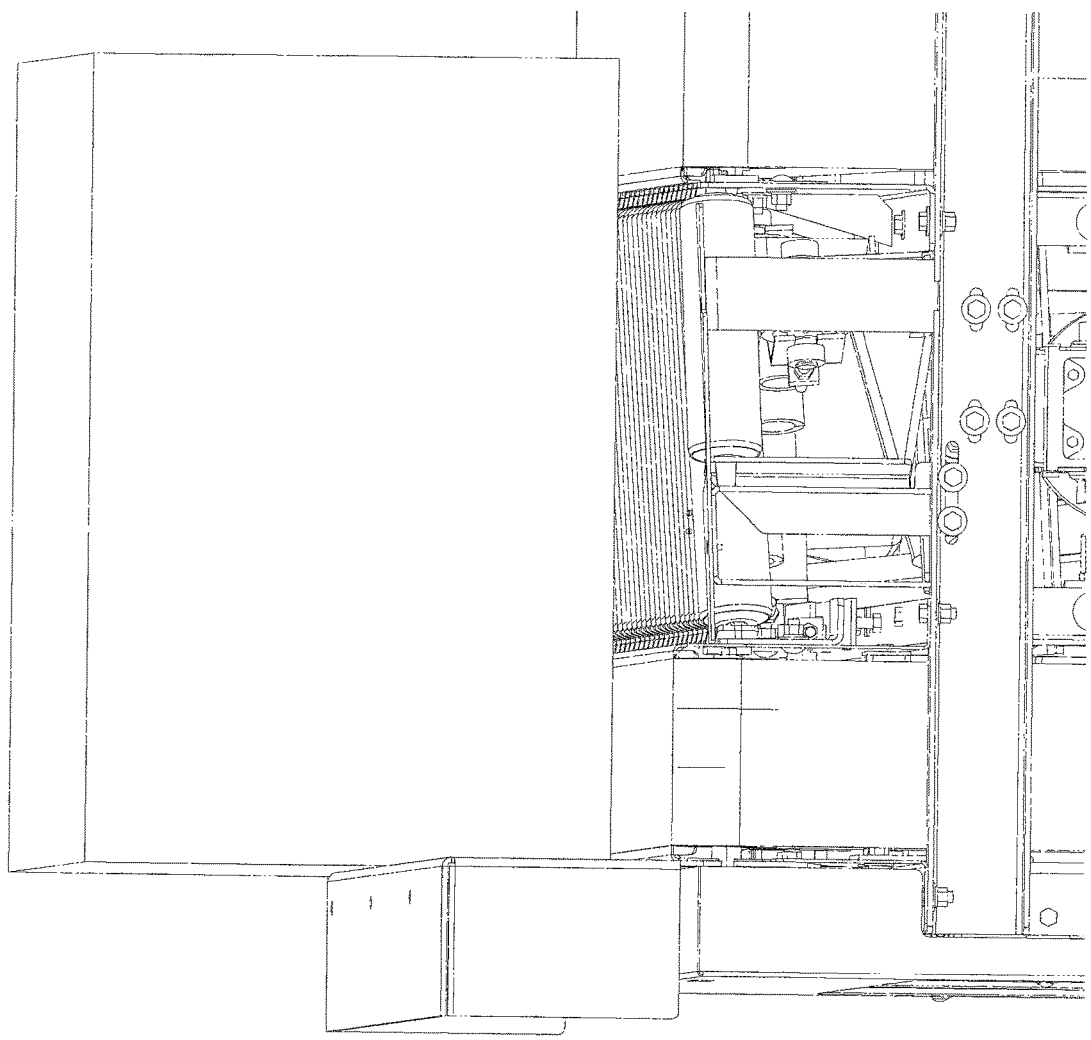
FIG. 13 is an up stream perspective end view of the conveyor assembly of FIG. 10, showing a package supported by the high friction conveying surface of the first conveying lane, extending across the second conveying lane, and having a portion of the package resting on the high friction conveying surface of the third conveying lane.
Figure 14:
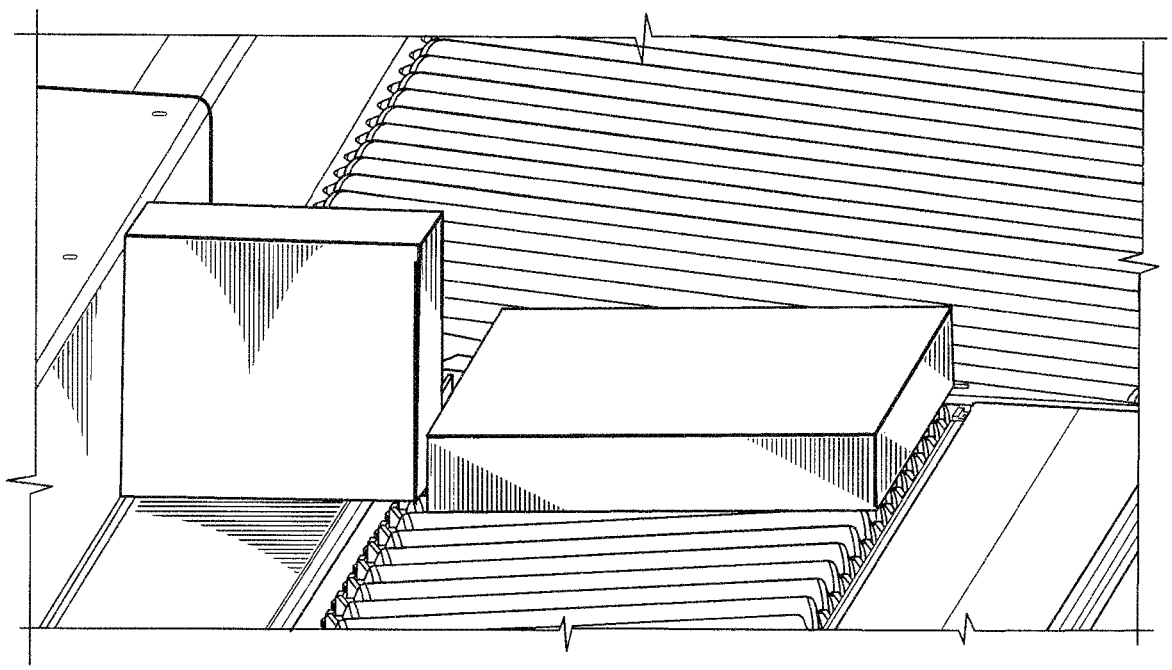
FIG. 14 is an up stream perspective end view showing a package resting on the first conveying lane moving forward and a side by side package resting on the second conveying lane moving forward and laterally toward the third conveying lane.
Figure 15:
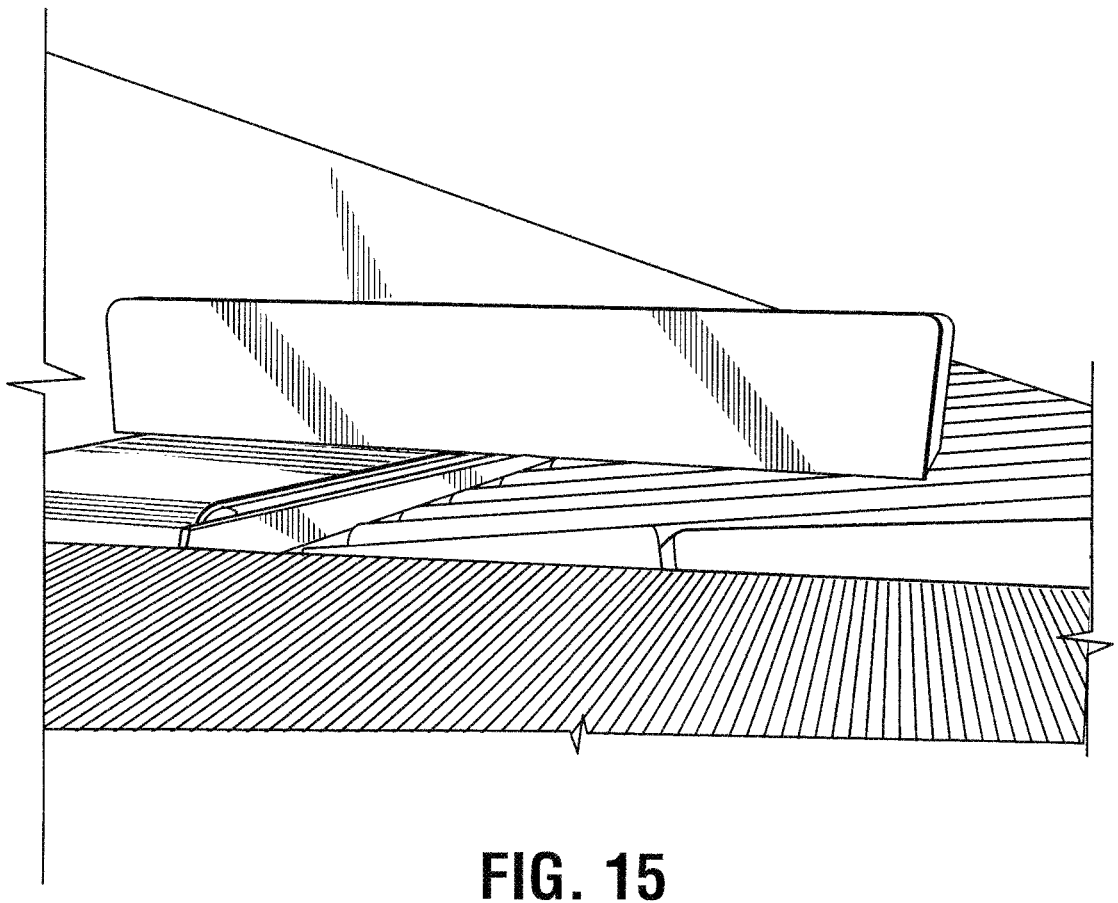
FIG. 15 is an up stream perspective end view of the conveyor assembly of FIG. 10, showing a package resting on the first conveying lane and a portion of the second conveying lane which is moved forward to the down stream conveyor.

A preferred embodiment of the singulator 11 as shown in FIG. 10 includes three driven conveyors 3, 4, and 5 arranged in parallel relationship adjacent one another. Additional lanes utilizing the same conveyor configuration is possible. The conveyors typically lie in a horizontal position along their lateral axis. A laterally positioned side wall 2 extends along side a first conveyor 3 which tends to convey items forward and along the laterally positioned side wall 2.

The driven first conveyor lane 3 includes a solid or mesh belt 22 or rollers having a first high friction surface for conveying articles 7, 8, along a vertical side wall 2 where incoming items are positioned there along at a selected speed. The width of the conveying lanes is determined by the size or dimensions of the packages. The width of the first conveying lane is sized to be equal to of less than the smallest package width.

A second conveying lane 4 having a lower friction surface includes both a forward (L) and lateral (L') conveying forces. The second conveying lane 4 typically comprises a series of driven rollers 34 whose rotary axes are skewed relative to a lateral direction of travel so that the packages are conveyed simultaneously laterally forward (in direction L) and laterally outwardly L' away from the first conveying lane 3 and side wall 2. As a result the packages tend to form a single file traveling laterally along the side wall 2 on the first conveying lane surface 3, or the center of gravity or frictional forces cause the package to extend over the edge of the first conveying lane 3 and a portion to rest on the second conveying lane 4 which moves in a forward direction L and lateral direction L'. The package would still move forward so long as a portion rests upon the high friction surface of the first conveying lane 3. The width of the second conveying lane 4 having the lower friction surface is typically greater than the width of the first conveying lane 5 having lower friction surfaces in order to allow lateral movement and separation of the packages thereon.

As shown in FIG. 10, the inner edge 36 of the second conveying lane adjacent the outer edge 38 of the first conveying lane is disposed at a slightly lower elevational along the lateral axis, then the first conveying lane providing a lower elevation 33 situated between the first and second conveying lanes so that packages resting on both the first conveying lane 3 and the second conveying lane 4 will be held securely and be pulled forward by the first conveying lane 3 having a high friction surface. The lower friction conveying surface of the second conveying lane 4 is angled vertically upward at a selected angle of up to 30 degrees from the outer edge of the first conveying lane providing an inclined plane extending upward toward the third conveying lane so that the outer lateral edge 45 of the second conveying lane is equal to or slightly lower than the inner lateral edge 40 of the adjacent third conveying lane whereby articles are removed laterally as they move forward progressing on a somewhat inclined plane.

The lower friction conveying surface of the second conveying lane is set at the same elevation as the first conveying lane where it mates with the first conveying lane. The second conveying lane includes forward and lateral forces away from the first conveying lane and upward toward the third conveying lane. The outer lateral edge 42 of the angled second conveying lane extends upward to a lateral transition zone 36 slightly below or even with the lateral receiving edge 40 of the third conveying lane.

Figure 2:
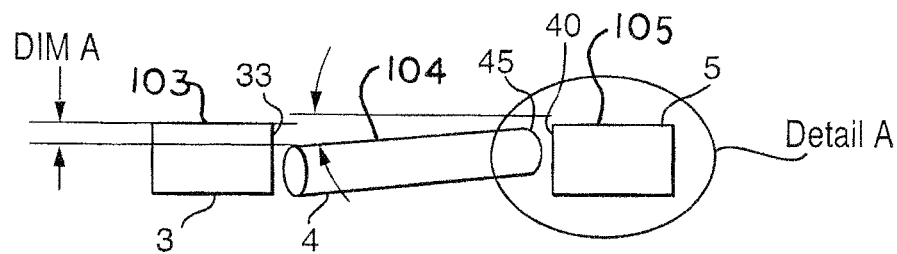
FIG. 2 is a sectional view of FIG. 1 showing the conveying surface of the second conveying lane is angled vertically upward forming an inclined plane having an angle extending above the lateral receiving edge of third conveying lane and the inner lower receiving edge of the second conveying lane extends below the outer edge of the first conveying lane and the outer lateral edge of the second conveying lane extends even with or below the inner lateral receiving edge of the third conveying lane surface.
Figure 3:
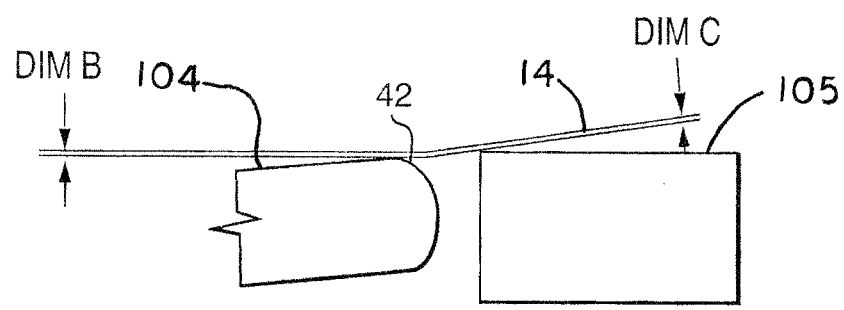
FIG. 3 is a enlargement of a portion of FIG. 2 showing that the outer lateral edge of the lower friction conveying surface of the second conveying lane is set at an elevation below the elevation of the third conveying lane conveying surface and that the plane of the second lane extends above the surface of the third conveying lane.
Figure 4:
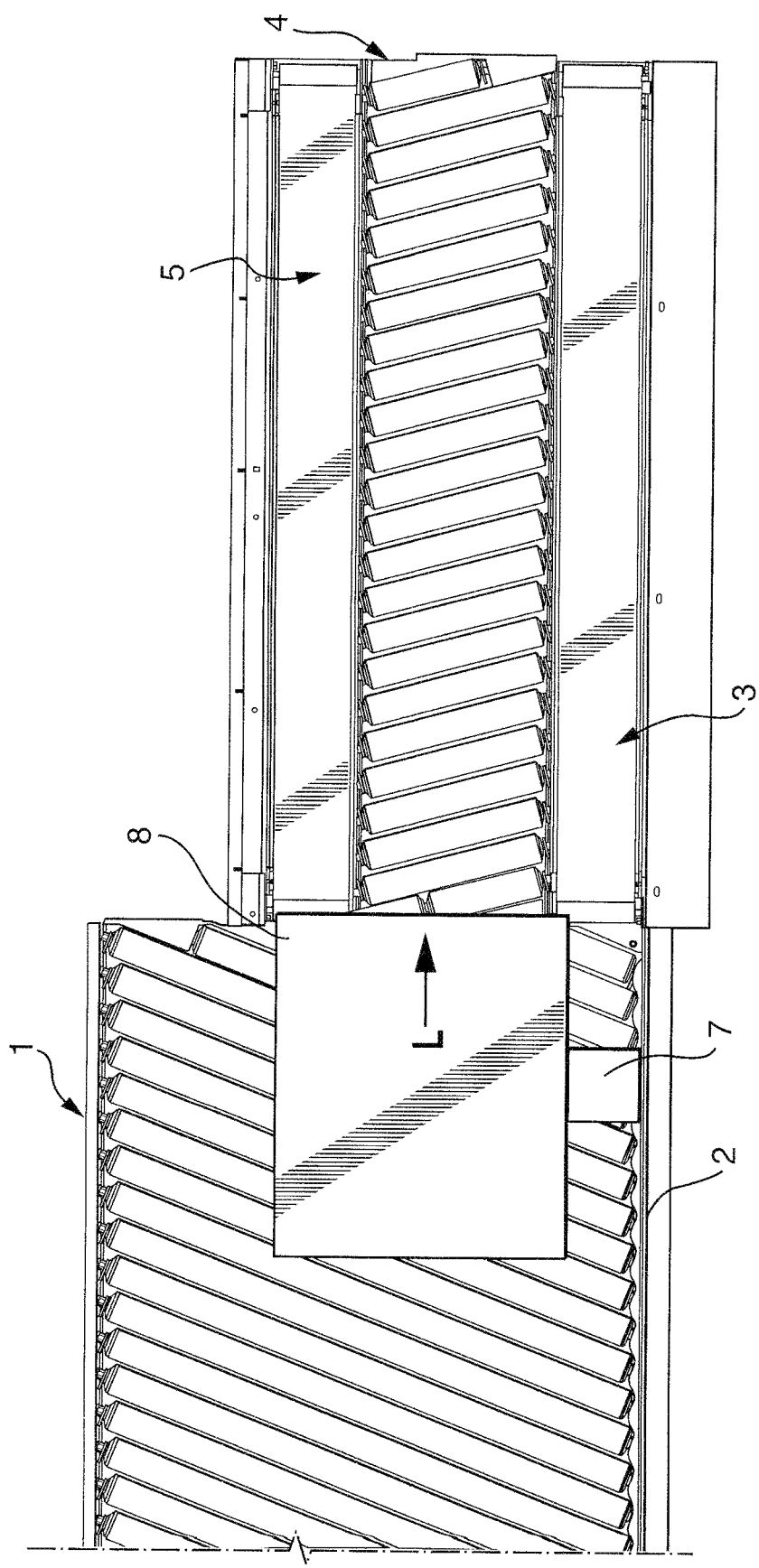
FIG. 4 shows a small package on the first conveying surface aligned the vertical side wall and large package supported by the high friction conveying surfaces of the first and third conveying lanes above the outer lateral edge of the second conveying lane.
Figure 5:
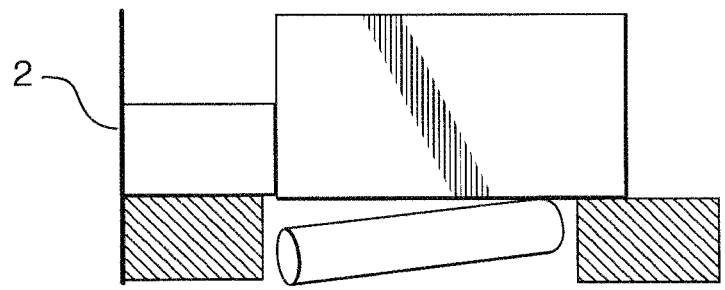
FIG. 5 is a sectional view of FIG. 4, showing the small package aligned with and conveyed on the first conveying lane and showing the large package having a portion positioned on the second conveying lane and a portion supported by the third conveying lane.
Figure 6:
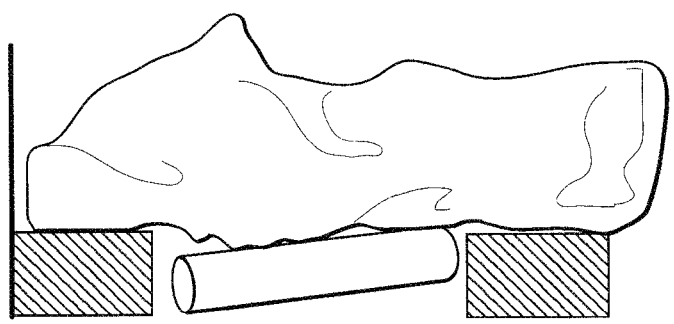
FIG. 6 shows a sectional view of FIG. 4 wherein a partially fill bag of small parcels positioned on the first, second, and third conveying lanes in a sectional view.

The conveying surface 104 of the second conveying lane 4 is best illustrated in a section view of FIGS. 2 and 3. The second conveying lane is angled laterally forming an inclined plane that includes the conveying surface of the second plane of the second conveying lane 4 extending above (DIM C) the conveying surface 105 of the third high friction conveying lane of the third conveying lane 5. The outer lateral edge of the conveying surface the second conveying lane 5 lane is below (DIM B) the elevation of the outer lateral receiving edge of the third conveyor lane 3; however, the spacing between the second and third conveying lanes allows for inclined plane of the conveying surface of the second conveying lane to extend over the inner lateral receiving edge of the third conveying lane. Moreover as shown in FIGS. 5 and 6 an outer lateral edge portion of an upper end of the second conveying lane may extend as high as the inner lateral receiving edge of the third conveying lane surface and/or touch the article; however, the second conveying lane outer lateral edge portion does not support an article resting on the first and third conveying lanes nor influence its movement.

When packages positioned abreast of one another on the feed conveying lane are feed onto the singulator, the forward forces of the first conveying lane pulls the package forward and the lateral forces of the second conveying lane forces the adjacent package away from the primary flow side wall to separate two small items that might enter abreast of one another.

The driven third conveying lane has a high friction surface which is laterally positioned alongside of the second conveyor lane on the opposite side from the first conveying lane primary flow side. The third conveying lane is elevated at the same level as the first conveying lane. The conveying surface of the third conveying lane is above the conveying surface plane that includes the second conveying lane where they form a transition zone.

Large packages which hang over the side of the first conveying lane having a portion resting on the second conveying lane are carried forward A portion of each article or package that extends above the third conveyor lane will move upward and over the third conveyor lane until the center of gravity extends past the lateral mating edge of the second conveying lane and third conveying lane and the package drops onto the high friction surface of the third conveying lane which pulls the article moving forward toward a discharge position.

The upper lateral edge of the second conveying lane is elevated at a selected distance below or even with the inner lateral edge of the third conveying lane for guiding, aligning and urging the articles upwardly until the center of gravity of the article passes beyond the outer lateral edge of the second conveying lane and the article rotates and rests atop of the high friction conveying surface of the third conveying lane. The selected lateral angle of the second conveying lane and the spacing between the second and third conveying lanes determine the requisite angle of the lateral plane formed by the angled conveying surface of the second conveying lane necessary for conveyance of articles transferring from the second conveying lane over the lateral side receiving edge of the third conveying lane as shown in FIGS. 16 and 17.

The rate of conveyor speed in the forward direction of the first, second, and third conveyor can be controlled independently; however, it is desirable for the first and third conveying lane to travel at the same rate of speed in order for large parcels resting on the first and third conveying lane high friction conveying surfaces to be conveyed thorough the singulator. If the third conveyor having a receiving side edge conveying surface is high than the outer edge of the conveying surface of the second conveyor, the second conveyor conveying surface will not exert drag on a large article passing through on the first and third conveying lanes. Because the third conveying lane utilizes a high friction conveying surface than the second conveying lane having a lower friction conveying surface, once an article in transition moves the center of gravity over the third conveying lane, the high friction conveying surface will pull the article forward onto the third conveying lane conveying surface.

The lateral momentum of the item being transferred laterally will tend to position the center of gravity of the item, so that the item falls under control of the third high friction lane's forward conveying forces, no longer influenced by the conveying forces of the second lane. Small items, rigid and non rigid, entering and coming in contact with the first high friction lane, wholly, are not transferred laterally away from the primary flow side along the wall). Slightly larger items, rigid an non rigid, entering and coming in contact with the first high friction lane and the second will not tend to be transferred laterally away from the primary flow side along the wall, due to the substantially high friction of the first lane. Slightly larger items, rigid an non rigid, entering and coming in contact with the first high friction lane and the second will not tend to be transferred laterally away from the primary flow side along the wall, due to the substantially high friction of the first lane. Large rigid items, such as boxes, will enter and rest exclusively on the first and third lane and are not influenced by the lateral component forces of the second low friction lane even if a portion of the parcel touches the outer lateral edge of the second conveying lane.

Large bags containing small items enter, and due to their lack of rigidity, with come into contact with all three lanes. But, the combination of friction forces presented by the first and third will tend to resist the lateral forces applied by the second lane, allowing the item to transfer straight through, without being laterally shifted away from the primary flow along the wall.

The first conveyor 3 and third conveyor 5 high friction conveying lanes can each be formed by endless conveyor belts comprised of rollers covered or coated with a high friction surface such as a rubber or an elastomer compound; a roller comprising a plastic or rubber compound or solid or mesh belts comprising rubber, elastomers, or polymers. The lower friction conveying lane of the second conveyor 4 is typically composed of metal such as aluminum, carbon steel, metal alloy, or stainless steel or a plastic material, a graphite material, or a tetrafluoroethylene, "TEFLON" material. The second conveyor lane might be formed by using a plastic modular belting, containing driven rollers with presenting a conveying force with a lateral component.

The first conveyor and third conveyor high friction conveying lanes can each be formed by a plurality of rollers with an axis that is substantially horizontal and perpendicular to the primary flow direction, and includes a high friction surface. The first conveying lane and third conveying lane need not be both of same type, but preferably comprise an endless belt or high friction surfaced rollers.

The second conveyor 4 lane can be formed by plurality of rollers oriented to generate conveying forces that are forward with primary flow direction of the first high friction conveyor and also having a lateral component away from the first conveying lane and primary wall, and include an upward component in the lateral direction away from the first conveying lane primary flow lane.

The entire machine might not be arranged with both high friction surfaces horizontal, but could be arranged at an angle so that the second lane falls in a horizontal plane, or at a point where all three are at an angle, but the relative positions is maintained as described above.

In another preferred embodiment, the second conveying lane includes a lower friction surface traveling in a forward direction and lateral direction away from the first conveying lane and toward the third conveying lane. The edge of the second conveying lane is disposed below the first conveying lane and forms an inclined plane angled upward from the first conveying lane toward the third conveying lane but slightly above the surface of the third conveying lane. In this manner, when a package travels along having a portion resting on the first and second conveying lane, the package will tend to be pulled forward. Packages not resting on the first conveying lane will tend to move from the second conveying lane toward the third conveying lane along the inclined plane.

The present invention also includes a method of conveying articles. The method consists of or comprises transferring articles in single file or side by side onto a singulator device comprising at least three driven conveyors arranged in an adjacent parallel configuration. Moving articles along a first conveyor having a high friction surface for conveying articles forward along a vertical side wall where incoming items are positioned there along. Moving articles onto a adjacent second conveyor having a lower friction surface disposed adjacent the first conveying lane wherein the lateral edge of the second conveying lane is at a lower elevation than the first conveying lane and wherein the second conveying lane comprises a series of driven rollers having rotary axes skewed relative to a lateral direction of travel so that the packages are conveyed simultaneously laterally forward and laterally outwardly away from the first conveying lane with the second conveying lane is transversely inclined and angled upward. Articles from the second conveying lane move upward forward and laterally from the second conveying lane toward a third conveying lane having a high friction surface.

More particularly, the method of conveying articles utilizes a conveying system including a singulator having at least three driven conveying lanes arranged in an adjacent parallel configuration. The singulator includes a first conveying lane having a high friction surface for conveying articles forward along a vertical side wall where incoming items are positioned there along. A second conveying lane has a lower friction surface disposed adjacent the first conveying lane at a lower elevation and the second conveying lane comprises a series of driven rollers having rotary axes skewed relative to a lateral direction of travel so that the packages are conveyed simultaneously laterally forward and laterally outwardly away from the first conveying lane. The second conveying lane is transversely inclined and angled upward. A third conveying lane has a high friction surface disposed above, or even and adjacent to the upper outer edge of the second conveying lane for conveying articles forward. The method includes the steps of conveying in a forward direction articles contacting only the first conveying lane high friction surface conveying lane, and articles contacting both the first and second lower friction surface conveying lane which are moving forward and laterally away from the first conveying lane high friction surface conveying lane.

Articles contacting the second conveying lane and being out of contact with the first conveying lane are conveyed upward and over a lateral edge extending above a third conveying lane having a high friction surface lane conveying in a forward direction moving the articles forward and laterally until the center of gravity of the articles extends over the third conveying lane where the articles drop off of a chute and are removed or recirculated It is contemplated that a vertical wall or vertical side panel, or vertical belt may extend along an inner side of the first inner primary conveyor for abutment and alignment of packages in flow communication therewith.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplifications presented herein above. Rather, what is intended to be covered is within the spirit and scope of the appended claims.

We claim:

1. A singulator conveyor apparatus, comprising:
    a first conveying lane, a second conveying lane, and a third conveying lane, each one driven and arranged in an adjacent parallel configuration;
    said first conveying lane having a high friction conveying surface for conveying articles forward along a vertical side wall for receiving articles from an upstream conveyor;
    said second conveying lane having a lower friction conveying surface than said first conveying lane, said second conveying lane disposed beside said first conveying lane and having an inner receiving edge disposed at a lower elevation than the outer edge of said first conveying lane, said second conveying lane comprising a series of driven rollers having rotary axes skewed relative to a forward direction of travel so that said articles are conveyed simultaneously forward and laterally outwardly away from said first conveying lane and said vertical side wall, said second conveying lane being transversely inclined and angled upward forming an elevated outer side edge;
    said second conveying lane having a conveying surface forming an inclined plane extending at an angle above an inner receiving side edge of said adjacent third conveying lane and spaced apart from said third conveying lane a selected distance conveying said articles from said second conveying surface up and over onto said third conveying lane; and
    said third conveying lane having a higher friction conveying surface than said second conveying lane, said higher friction conveying surface of said third conveying lane having an inner receiving side edge at an elevation higher than said elevated outer side edge of said second conveying lane.

2. The singulator conveyor apparatus of claim 1, wherein said first conveying lane and said third conveying lane are driven at the same rate of speed.

3. The singulator conveyor apparatus of claim 2, wherein said first conveying lane and said third conveying lane are in parallel lateral alignment in a selected plane.

4. The singulator conveying lane apparatus of claim 1, wherein said second conveying lane is angled in a lateral direction upward from said first conveying lane to said third conveying lane in a range of from 1 to 30 degrees relative to a horizontal plane of said first conveying lane.

5. The singulator conveyor apparatus of claim 1, wherein said second conveying lane is angled in a lateral direction upward from said first conveying lane to said third conveying lane in a range of from 5 to 25 degrees relative to a horizontal plane of said first conveying lane.

6. The singulator conveyor apparatus of claim 1, said outer lateral edge of said second conveying lane is set at an elevation even with said inner lateral edge of said third conveying lane.

7. The singulator conveyor apparatus of claim 1, said outer lateral edge of said second conveying lane is set at an elevation lower than said inner lateral edge of said third conveying lane.

8. The singulator conveyor apparatus of claim 1, wherein said first, second, and third, conveying lanes are selected from the group consisting of endless belt conveying lanes, endless roller conveying lanes, and combinations thereof.

9. The singulator conveyor apparatus of claim 1, wherein said high friction conveying surface comprises a plastic, an elastomer, a rubber, a coating, and combinations thereof.

10. The singulator conveyor apparatus of claim 1 wherein said lower friction conveying surface comprises a metal, a plastic, a graphite material or a tetrafluoroethylene material.

11. The singulator conveyor apparatus of claim 1, wherein said first high friction conveying surface comprises a belt, said second conveying lane lower friction conveying surface comprises rollers, and said third conveying lane high friction conveying surface comprises a belt.

12. A singulator conveyor apparatus conveying system comprising:
    a singulator conveying lane apparatus comprising at least three driven conveying lanes arranged in an adjacent parallel configuration;
    a first conveying lane having a high friction surface for conveying articles forward along a vertical side wall where incoming articles are positioned there along;
    a second conveying lane having a lower friction conveying surface disposed beside said first conveying lane having an inner receiving edge at a lower elevation, said second conveying lane comprising a series of driven rollers having rotary axes skewed relative to a forward direction of travel so that said articles are conveyed simultaneously forward and laterally outwardly away from said first conveying lane and said vertical side wall, said second conveying lane being transversely inclined and angled upward at a selected angle forming an elevated outer side edge;
    said second conveying lane having a conveying surface forming an inclined plane extending at a selected angle above a receiving side edge of an adjacent third conveying lane; and
    said adjacent third conveying lane having a high friction conveying surface adjacent said second conveying lane for conveying articles forward, said high friction surface of said adjacent third conveying lane having an inner receiving side edge at an elevation higher or even with said elevated outer side edge of said second conveying lane; and
    wherein said second conveying lane angles upward in a range of from 5 to 25 degrees relative to a horizontal plane.

13. The singulator conveyor apparatus of claim 12, further including a feed conveyor having a lower friction conveying surface and a series of driven rollers whose rotary axes are skewed relative to a lateral forward direction of travel for conveying said articles simultaneously laterally forward and laterally inwardly toward said first conveying lane.

14. The singulator conveyor apparatus of claim 12, wherein said second conveying lane is angled in a lateral direction upward from said first conveying lane to said third conveying lane whereby said angle of inclination is from 1 to 30 degrees relative to horizontal plane of said first conveying lane.

15. The singulator conveyor apparatus of claim 12, wherein said outer side edge of said second conveying lane extends below said inner side edge of said third conveying lane.

16. The singulator conveyor apparatus of claim 12, wherein said first, second, and third, conveying lanes are selected from the group consisting of endless belt conveying lanes, endless roller conveying lanes, and combinations thereof.

17. The singulator conveyor apparatus of claim 12, wherein said high friction conveying surface comprises a plastic, an elastomer, a rubber, a coating, and combinations thereof.

18. The singulator conveyor apparatus of claim 12 wherein said lower friction conveying surface comprises a metal, a plastic, a graphite material or a tetrafluoroethylene material.

19. The singulator conveyor apparatus of claim 12, wherein said first conveying lane high friction conveying surface comprises a belt, said second conveying lane lower friction conveying surface comprises rollers, and said third conveying lane high friction conveying surface comprises a belt.

20. The singulator conveyor apparatus of claim 12, said outer lateral edge of said second conveying lane is set at an elevation even with said inner lateral edge of said third conveying lane.

21. The singulator conveyor apparatus of claim 12, said outer lateral edge of said second conveying lane is set at an elevation lower than said inner lateral edge of said third conveying lane.

22. The singulator conveyor apparatus of claim 12, wherein said first conveying lane and said third conveying lane comprise an endless belt.

23. The singulator conveyor apparatus of claim 12, wherein said first conveying lane and said third conveying lane comprise a plurality of rollers with an axis that is substantially horizontal and perpendicular to the primary flow direction and includes a high friction conveying surface.

24. The singulator conveyor apparatus of claim 12, said first conveying lane and said third conveying lane are the same height.

25. The singulator conveyor apparatus of claim 12, said third conveying lane is positioned at a high level than said first conveying lane.

26. The singulator conveyor apparatus of claim 12, said article is moved laterally on said second conveying lane lower friction conveying surface until the center of gravity of said article passes beyond the outer lateral edge of said second conveying lane and said article rotates and rests atop of said high friction conveying surface of said third conveying lane.

27. The singulator conveyor apparatus of claim 12, wherein rigid articles and nonrigid articles resting on said first conveying lane will by conveyed along a primary flow along said vertical side wall.

28. The singulator conveyor apparatus of claim 12, wherein rigid articles resting on said first conveying lane high friction surface and said third conveying lane high friction surface will by conveyed straight through along a primary flow.

29. The singulator conveyor apparatus of claim 12, wherein nonrigid articles comprising bags of small articles having a portion resting on said first conveying lane high friction surface a portion resting on said second conveyor lower friction surface, and a portion resting on said third conveying lane high friction surface will by conveyed straight through without being laterally shifted away from a primary flow.

30. The singulator conveyor apparatus of claim 12, wherein nonrigid articles comprising bags of small articles having a portion resting on said second conveying lane lower friction surface and a portion resting on said third conveying lane high friction surface will move forward and laterally until the center of gravity of said article resting on said second conveying lane lower friction surface passes beyond said outer lateral edge of said second conveying lane and said nonrigid article rotates and rests atop of said high friction conveying surface of said third conveying lane.

31. The singulator conveyor apparatus of claim 1, wherein the speed of said first conveying lane, said second conveying lane, and said third conveying lane is adjustable relative to one another.

32. The singulator conveyor apparatus of claim 31, wherein said first conveying lane and said third conveying lane travel at the same rate of speed in order for large parcels resting on said first conveying lane and said third conveying lane to be conveyed thorough said singulator conveyor apparatus.

33. The singulator conveyor apparatus of claim 1, wherein said second conveying lane is inclined at an obtuse angle with respect to the longitudinal direction and the speed of said second conveying lane is set so that it has a forward longitudinal component equal to the forward speed of said first conveying lane so that a parcel resting on both of said first conveying lane and said second conveying lane will travel forwardly without being rotated.

34. The singulator conveyor apparatus of claim 12, wherein the speed of said first conveying lane, said second conveying lane, and said third conveying lane is adjustable relative to one another.

35. The singulator conveyor apparatus of claim 34, wherein said first conveying lane and said third conveying lane travel at the same rate of speed in order for large parcels resting on said first conveying lane and said third conveying lane to be conveyed thorough said singulator conveyor apparatus.

36. The singulator conveyor apparatus of claim 12, wherein said second conveying lane is inclined at an obtuse angle with respect to the longitudinal direction and the speed of said second conveying lane is set so that it has a forward longitudinal component equal to the forward speed of said first conveying lane so that a parcel resting on both of said first conveying lane and said second conveying lane will travel forwardly without being rotated.

* * * * *